United States Patent Office 3,014,067
Patented Dec. 19, 1961

3,014,067
PROCESS FOR THE PRODUCTION OF AROMATIC
DI- AND POLYCARBOXYLIC ACIDS
Bruno Blaser, Dusseldorf-Urdenbach, and Bernhard
Raecke and Hubert Schirp, Dusseldorf, Germany, assignors to Henkel & Cie. G.m.b.H., Dusseldorf-Holthausen, Germany, a corporation of Germany
No Drawing. Filed Oct. 15, 1957, Ser. No. 690,198
Claims priority, application Germany Oct. 15, 1956
6 Claims. (Cl. 260—515)

This invention relates to the production of aromatic carboxylic acids. The invention more particularly relates to a process for producing aromatic carboxylic acids by the rearrangement of carboxyl groups on salts of aromatic carboxylic acids other than the one to be produced, by heating the salts in an inert atmosphere in the presence of a water-binding agent.

We have previously found that alkali metal salts of carboxylic acids, the carboxyl groups of which are attached to aromatic ring systems, can be transformed into salts of other aromatic carboxylic acids with at least two carboxyl groups in the molecule by heating to elevated temperatures in the presence of an inert protective gas. In this reaction the carboxyl groups may change places within the same molecule as well as between several molecules. Industrially valuable di- and polycarboxylic acids, such as terephthalic acid and trimesic acid, are obtained as reaction products. In addition, in some cases, especially when alkali metal salts of monocarboxylic acids are used as starting materials, the ring systems free from carboxylic groups are formed as side products.

In accordance with our copending application, U.S. Serial No. 643,952, filed March 5, 1957, now abandoned, the rearrangement of salts of aromatic carboxylic acids into salts of other carboxylic acids by heating to elevated temperatures in the presence of carbon dioxide under pressure may be especially advantageously carried out by working at a pressure above 400 atmospheres, preferably in the presence of acid-binding agents. This method produces substantially improved yields of polycarboxylic acids, preferably di-carboxylic acids, especially when aromatic monocarboxylic acids are used as starting materials, while the amount of aromatic compounds free from carboxyl groups formed as side products decreases or even completely disappears. On the basis of the yields obtained thereby, it must be assumed that carbon dioxide, from the gas phase and/or from the carbonate present as the acid-binding agent, enters into the aromatic ring by forming new carboxyl groups.

In accordance with another of our copending applications, U.S. Serial No. 686,858, filed September 30, 1957 it is possible to obtain good yields with this process even at pressures lower than 400 atmospheres if the reaction is carried out in the presence of alkali metal salts, preferably potassium salts of or derivatives of cyanic acid or its polymers.

We have now found that in place of the salts or derivatives of cyanic acid, those compounds may be used which are capable of binding the water formed during the reaction or which are capable of reacting with this water without interfering with the reaction proper. If salts of aromatic carboxylic acids, especially aromatic monocarboxylic acids, are heated in the presence of such compounds as well as in the presence of carbon dioxide, which may also be present in combined form, and in the presence of acid-binding agents, to temperatures above 350° C., very good yields of salts of aromatic di- and polycarboxylic acids are obtained.

It is an object of this invention to produce aromatic carboxylic acids by heating salts of aromatic carboxylic acids other than the one to be produced in an inert atmosphere.

Another object is to increase the yield of product in an aromatic carboxylic rearrangement by providing a water-binding agent for the process.

These and other objects of our invention will become apparent as the description thereof proceeds.

As starting materials for the process according to the invention, salts of aromatic mono-, di- or polycarboxylic acids may be used. Such acids are, for example, benzoic acid, $\alpha$- and $\beta$-naphthoic acid, diphenyl monocarboxylic acids as well as phthalic acid, isophthalic acid, terephthalic acid, naphthalic acid and other naphthalene dicarboxylic acids or diphenic acid and other diphenyl dicarboxylic acids. Also mono- or dicarboxylic acids in which the carboxylic groups are attached to another aromatic ring system, for example to anthracene, terphenyl, diphenyl methane or benzophenone radicals, are suitable for use as starting materials for the process according to the invention, as well as tri- and polycarboxylic acids which are derived from aromatic ring systems. Also mixtures of such acids which are formed, for example, by oxidation or mixtures of alkyl aromatic compounds or coal, may be used. In all of these carboxylic acids, the aromatic ring may carry other substituents, such as halogen atoms or alkyl radicals, in addition to the carboxyl groups provided that these substituents do not bring about a decomposition of the molecule at temperatures lower than the reaction temperature. If aromatic monocarboxylic acids are used as starting materials for the performance of the process according to the invention on an industrial scale, the reaction products obtained thereby are industrially valuable dicarboxylic acids or their salts and in many cases are those dicarboxylic acids which have a symmetric structure, for example, terephthalic acid, naphthalene-2,6-dicarboxylic acid, and the like. In addition, tricarboxylic acids are formed in many cases.

The above-mentioned carboxylic acids are used as starting materials for the process of this invention in the form of their salts. Advantageously, the alkali metal salts, preferably the potassium salts or the sodium salts, are used. The lithium, rubidium and cesium salts, which may also be used for this reaction, are generally not considered for reasons of economy. In the place of the salts, mixtures may also be used which are transformed into the salts upon heating, for example, mixtures of carboxylic acid, anhydrides and alkali metal carbonates. In such mixtures the components do not need to be present in stoichiometric ratio. It is often advantageous to use mixtures of salts of two different metals, for example, mixtures of the sodium and potassium salts, because in many cases the mechanical properties of the reaction mixture are improved thereby.

The process may also be carried out with salts of other metals, for example, with alkaline earth metal salts of the above-named carboxylic acids. In this case different reaction products are often formed, especially those having the carboxyl groups in different positions, than if the alkali metal salts are used.

As acid-binding agents, the carbonates of alkali metals, especially potassium carbonate, are preferably used. In place of the carbonates, the salts of other weak acids may be used, for example, the bicarbonates, formates or oxalates. Also the corresponding compounds of other metals are suitable, for example, the carbonates of the alkaline earth metals. The acid-binding agents do not need to be present in stoichiometric amounts. They may be used in excess or in deficient quantities.

In accordance with the process of the invention, the heating is carried out in the presence of carbon dioxide as well as in the presence of compounds which are capable of binding or combining with the water formed by the reaction without interfering with the reaction proper. Such compounds are, for example, various metal carbides such as aluminum carbide or the carbides of the alkali metals or alkaline earth metals such as calcium carbide. Also, other compounds of such metals, for example their nitrides or borides, may be used. Free metals which readily react with water under the prevailing reaction conditions, for example aluminum, also may be used. The binding of the water formed by the reaction may also be accomplished with the aid of suitable salts, for example, with alkali metal carbonates, especially potassium carbonate, which must in this case be present in amounts considerably in excess of the quantity needed for neutralization of the newly formed carboxyl groups. The above-mentioned starting materials are heated in the presence of carbon dioxide, which may also be present in combined form, for example in the form of a carbonate. The heating is preferably carried out in the presence of gaseous carbon dioxide under pressure. There is no upper limit for the pressure, that is, the upper presure limit is determined only by the available apparatus, pumps, etc. The advantage of the process in accordance with the invention, however, resides in that very high pressures are not required to achieve good yields. The reaction may also be carried out at atmospheric pressure. In place of carbon dioxide, gas mixtures may be used which contain inert gases such as nitrogen, methane or argon in addition to carbon dioxide. The presence of large amounts of oxygen should advantageously be avoided.

In general, the reaction begins at temperatures above 350° C. However, the optimum reaction temperature is different for and depends on the various starting materials used. The upper temperature limit for the process is determined only by the decomposition temperature of the reaction products.

If the above-described starting materials are solids, they are preferably used in dry and finely divided form and are intimately mixed with each other. In order to avoid local overheating and decomposition caused thereby, as well as to avoid caking of the reaction mixture, it is advantageous to maintain the reaction mass in motion. This may be accomplished, for example, by carrying out the reaction in vessels provided with a stirring device, in screw conveyors or in rocker or rotary autoclaves. However, uniform heating may also be effected by distributing the starting materials in thin layers and in this method the reaction mixture may be agitated or may remain stationary. Good yields, however, are also obtained without these special measures provided care is taken that strong local overheating is avoided. The process may also be carried out in a fluidized bed of the solid starting materials, using carbon dioxide as the fluidizing gas.

Since the reaction mixtures tend to cake, it is often advantageous to perform the process in the presence of inert liquid or solid additives which are adapted to prevent the caking and improve the gas-permeability of the reaction mixture. Such additives are, for example, sand, pumice stone powder, metal powder, metal shavings, kieselguhr, activated charcoal, aluminum oxide, or inert salts such as sodium sulfate. In place of these solid inert materials, inert liquids may be used provided they do not decompose under the prevailing conditions. Aromatic hydrocarbons may also be added which may be transformed under the prevailing reaction conditions into salts of aromatic carboxylic acids in accordance with our copending application, U.S. Serial No. 686,007, filed September 25, 1957, now U.S. Patent No. 2,948,750.

It has further been found that the reaction according to the invention is favorably influenced by the presence of catalysts. Metals such as zinc, cadmium, mercury, lead and iron, as well as compounds of these metals such as their oxides and salts formed with inorganic or organic acids and their metal-organic or their complex compounds, among others, their carbonates, bicarbonates, halides, sulfates, formates, phosphates, oxalates, fatty acid salts or the salts of the above metals formed with those acids which may serve as starting materials for the reaction according to the invention or which are formed by this reaction, for example, their benzoates, phthalates or terephthalates, may be used as catalysts. The amount of catalyst used may vary within wide limits and may range from 0 to 15%, preferably from 0.5 to 5%, by weight based on the weight of the reaction mixture. The catalysts may be especially finely divided throughout the reaction mixture by transforming an aqueous solution of the salts serving as the starting materials, which contain the catalysts dissolved or suspended therein, into a dry powder by spray-drying or by other suitable methods. The above-named catalysts may also be used in conjunction with known carriers such as kieselguhr.

The reaction mixtures may be worked up in accordance with known methods, for example as follows:

The raw product is first dissolved in water and thereafter the insoluble components are filtered off. Subsequently, the salts formed by the reaction can be transformed into the corresponding free acid salts by acidifying the filtered solution with organic or inorganic acids or by introducing carbon dioxide into the filtered solution at atmospheric or elevated pressure, and then separating the free acids from the acidified solution. The individual reaction products may be separated from each other and isolated in pure form by methods which are based upon their different solubilities or volatilities, and may thereafter, if desired, be transformed into their derivatives. The salt mixture produced by the reaction may also be transformed directly into derivatives of the acids, for example into their esters or halides, and these derivatives may be purified, if desired, by fractional distillation.

The following examples will enable persons skilled in the art to better understand and practice the invention and are not intended to be limitative.

*Example I*

80 gm. potassium benzoate, 34.5 gm. anhydrous potassium carbonate, 20 gm. aluminum carbide and 5 gm. cadmium fluoride were thoroughly admixed with each other in a ball mill and the mixture was placed into an autoclave having a volume of about 600 cc. Thereafter the air in the autoclave was displaced with carbon dioxide and carbon dioxide was continuously introduced so that a pressure of about 300 atmospheres could develop at a temperature of 410° C. The reaction mixture was then heated for 10 hours at about 410° C. The internal temperature was about 410° C. and the wall temperature from 415° to 420° C. At the same time, a constant pressure of 300 atmospheres was maintained in the autoclave. After cooling the autoclave and releasing the pressure, the raw reaction product which weighed 143 gm. was dissolved in water and the soluble components were filtered off. The filtrate was acidified with concentrated hydrochloric acid while hot and the precipitated terephthalic acid was filtered off while hot and was washed several times with hot water. The yield was 53.8 gm. By extraction with ether, 1.55 gm. benzoic acid were recovered from the mother liquor.

*Example II*

480 gm. potassium benzoate, 207 gm. potassium carbonate and 20 gm. of the complex salt $K_2[Cd(CN)_4]$ were dissolved in water and the solution was spray-dried in a Krause tower. 120 gm. of the dry salt mixture thus obtained were admixed with 20 gm. aluminum carbide and the mixture was heated for 10 hours at 405° C. in an autoclave (internal temperature 405° C., wall temperature 415° C.). At the beginning of the run carbon dioxide was introduced into the autoclave until the internal pressure reached 60 atmospheres. The maximum pressure reached during the heating step was 220 atmospheres.

The raw product which weighed 133 gm. was worked up in the manner described in Example I. 48.15 gm. terephthalic acid were obtained. By crystallization and extraction with ether, 7.75 gm. trimesitinic acid were isolated from the mother liquor.

*Example III*

16.0 gm. potassium benzoate, 82.8 gm. potassium carbonate and 5.0 gm. of the double salt $K_2[CdF_2Cl_2]$ were admixed with each other in a ball mill. The resulting mixture was placed into an autoclave and heated for 3 hours at 390° C. and thereafter for 7 additional hours at 410° C. (internal temperature 410° C., wall temperature 415° C.). At the beginning of the run carbon dioxide was introduced into the autoclave until the internal temperature reached 60 atmospheres. The maximum pressure reached during the heat treatment was 250 atmospheres. The reaction product was worked up in the manner described in Example I. 12.6 gm. terephthalic acid were obtained. By extraction with ether, 0.2 gm. benzoic acid were recovered from the mother liquor.

*Example IV*

An aqueous solution of potassium benzoate and potassium carbonate in a molar ratio of 1:1 was transformed into a dry powder by spray-drying. 149 gm. of the powder thus obtained were thoroughly admixed with 20 gm. aluminum carbide and 6 gm. cadmium fluoride. This mixture was heated for 17 hours at a temperature of 400–410° C. in an autoclave having a net volume of 600 cc. At the beginning of the run and prior to heating, carbon dioxide was introduced into the autoclave until the internal pressure reached 50 atmospheres. The maximum pressure reached during the heating period was 140 atmospheres. After cooling and releasing the pressure, the reaction product which weighed 180 gm. was worked up in the manner described in Example I. The yield of terephthalic acid was 43.3 gm. After evaporation of the mother liquor, 11.4 gm. trimesitinic acid were obtained by crystallization and extraction with ether.

While we have described particular embodiments of our invention, it will be understood that the invention is not limited thereto and that various modifications may be made thereof without departing from the spirit of the disclosure and the scope of the following claims.

We claim:

1. In a process for the production of aromatic polycarboxylic acids by heating, as starting materials, alkali metal salts of aromatic monocarboxylic acids having the same ring structure as the acid to be produced, in an atmosphere of carbon dioxide, under substantially anhydrous conditions, to a temperature from between about 350° C. to a temperature below the decomposition temperature of the starting materials and products in the presence of an acid binding agent, whereby the starting salts are converted into the corresponding salts of the acid to be prepared, and thereafter separating the free acid to be prepared from the converted salts by acidification, the improvement of heating said starting salts in the presence of a water-binding agent capable of reacting with the water formed during the reaction in sufficient quantity to bind one-half mol of water for each mol of alkali metal carboxylate.

2. In a process for the production of aromatic polycarboxylic acids by heating, as starting materials alkali metal salts of aromatic monocarboxylic acids having the same ring structure as the acid to be produced in an atmosphere of carbon dioxide under substantially anhydrous conditions, to a temperature from between about 350° C. to a temperature below the decomposition temperature of the starting materials and products in the presence of an alkali metal carbonate as an acid binding agent, whereby the starting salts are converted into the corresponding salts of the acid to be prepared, and thereafter separating the free acid from the converted salts by acidification, the improvement of heating said starting salts in the presence of a carbide as a water-binding agent, said carbide being selected from the group consisting of aluminum, alkali metal and alkaline earth metal carbides.

3. The process of claim 2 wherein the carbide is aluminum carbide.

4. The process of claim 2 wherein the carbide is calcium carbide.

5. In a process for the production of aromatic polycarboxylic acids by heating, as starting materials, alkali metal salts of aromatic monocarboxylic acids having the same ring structure as the acid to be produced, in an atmosphere of carbon dioxide, under substantially anhydrous conditions, to a temperature from between about 350° C. to a temperature below the decomposition temperature of the starting materials and products in the presence of an alkali metal carbonate as an acid binding agent, whereby the starting salts are converted into the corresponding salts of the acid to be prepared, and thereafter separating the free acid from the converted salts by acidification, the improvement of heating said starting salts in the presence of a quantity of an alkali metal carbonate as a water binding agent in excess of the quantity required as an acid binding agent, wherein the excess amount is sufficient to bind one-half mol of water for each mol of alkali metal carboxylate used.

6. The process of claim 5 wherein the alkali metal carbonate is potassium carbonate.

References Cited in the file of this patent

FOREIGN PATENTS

| | | |
|---|---|---|
| 744,721 | Great Britain | Feb. 15, 1956 |
| 747,204 | Great Britain | Mar. 28, 1956 |

OTHER REFERENCES

Mellor's Modern Inorganic Chemistry, pages 600, 346 and 699 (1952).